Aug. 27, 1929.    L. S. MURPHY    1,726,190
TOOL HANDLE CONSTRUCTION
Filed May 24, 1926
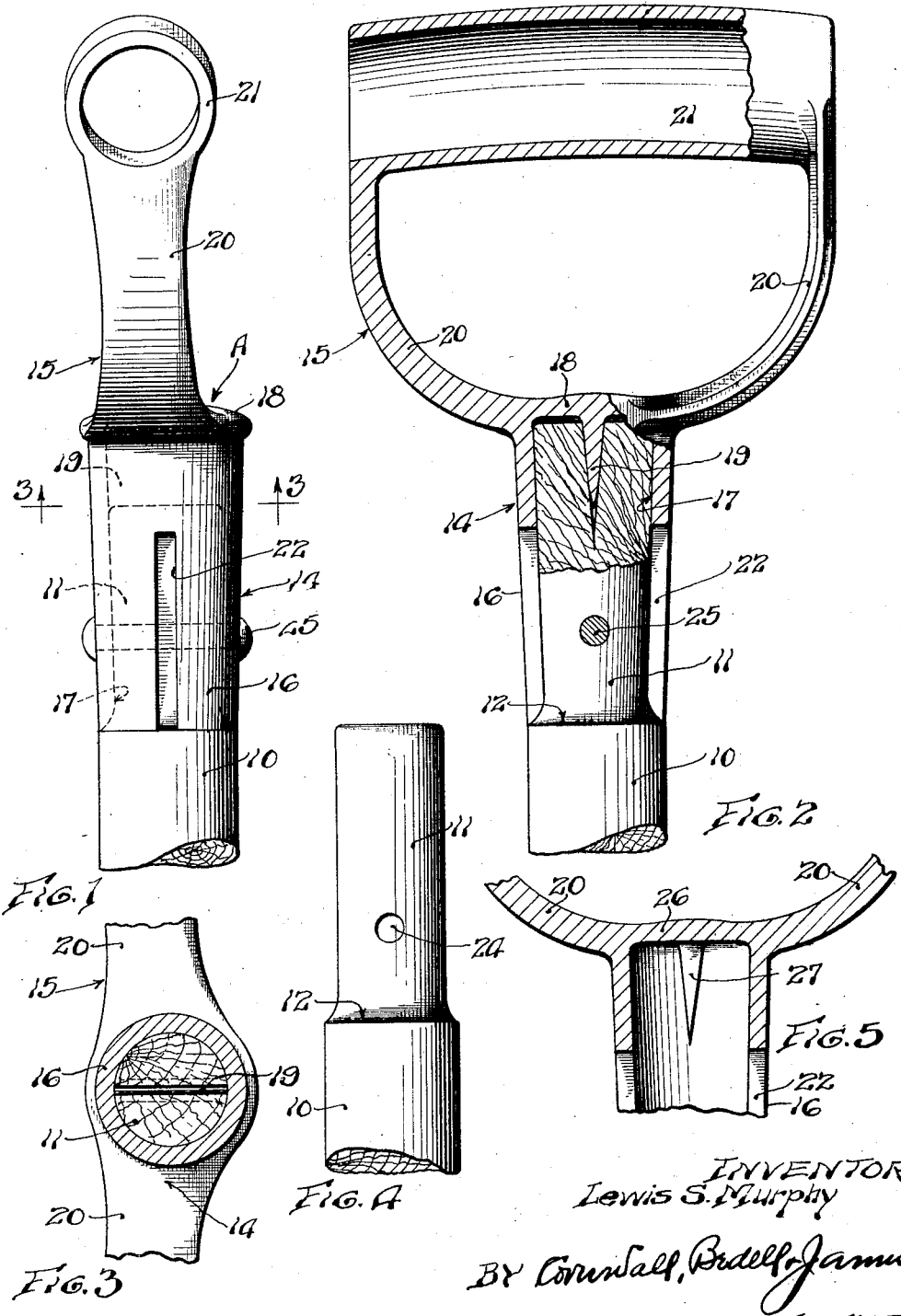

Patented Aug. 27, 1929.

1,726,190

UNITED STATES PATENT OFFICE.

LEWIS S. MURPHY, OF MARION, INDIANA, ASSIGNOR TO CHICAGO RAILWAY EQUIPMENT COMPANY, OF CHICAGO, ILLINOIS, A CORPORATION OF ILLINOIS.

TOOL-HANDLE CONSTRUCTION.

Application filed May 24, 1926. Serial No. 111,313.

This invention relates to new and useful improvements in tool handle construction for shovels, spades, forks and the like, the object of the invention being the construction of a handle which can be easily attached to the handle-stem and which when in position will not become loose but will form a firm union with said stem.

Further objects of the invention are to provide a handle which does not require the respective end of the stem to be finished in any particular form or subjected to any special treatment when securing the handle in position thereon, said handle being provided with a socket adapted to receive the end of the stem, there being a wedge formed in said socket for splitting said end as the handle is driven in position, thereby expanding said end in said socket so that it will be wedged in the latter.

Other objects of the invention are to provide a D handle or grip formed of a single piece casting having a socket for receiving the end of a handle-stem, said socket being formed tapered toward the open end and to provide means adapted to be driven into the end of said handle when occupying said socket, so as to split and expand said end in said socket and firmly secure said handle to said stem.

Additional objects of the invention are to provide a novel method of expanding the end of the handle-stem while in the socket of a D handle so as to provide a firm union between the handle and the stem.

With these and other objects in view my invention consists of certain novel features and arrangement of parts hereinafter more fully described and illustrated in the accompanying drawings, in which:—

Figure 1 is a side elevational view of the handle secured in position to the upper end of a handle-stem.

Figure 2 is a front elevational view of the same partly in cross section.

Figure 3, is a horizontal cross section taken on lines 3—3 of Figure 1.

Figure 4 is an end elevational view of the upper end of the handle-stem.

Figure 5 is a cross sectional view of a modified form of the handle.

Referring by numerals to the accompanying drawings, 10 indicates a handle-stem the lower end of which (not shown) is adapted to receive a suitable tool such as a spade, shovel, and the like. The upper end of said stem is preferably reduced in diameter as indicated at 11 thereby forming an annular shoulder 12.

A handle or grip 14 preferably of V-shape is formed of a single piece metal casting and consists of a D portion 15 with which is formed integral a tubular portion or socket 16 which is adapted to receive the reduced portion 11 of stem 10. This tubular portion 16 is preferably formed with downwardly tapered socket 17 having a large diameter at its upper or closed end and a reduced diameter at its open or receiving end. Depending from end wall 18 of socket member 16 and formed integral therewith is a transverse wedge member 19 having its entering edge disposed a suitable distance below the end wall 18. This wedge member 19 when handle 14 is driven in position splits the end of reduced portion 11 thereby causing the latter to expand in the upper part of socket 17, as shown in Figure 2, so that said portion 11 is firmly seated so as to bring the split ends of reduced portion 11 in proper pressure contact with the surfaces of socket 17.

The D portion consists of side pieces 20 curving and extending laterally on each side of the upper end of tubular member 16 and the upper extremities of said side portions are joined together by an open ended cylindrical portion or handle piece 21 which preferably has smooth outer faces and is proportioned to provide an efficient grip for the hand of the workman.

Side pieces 20 and hand piece 21 are slightly offset relative to the longitudinal axis of handle piece 10 and tubular member 16 as indicated at A in order to provide a proper clearance when hammering or driving the handle in position on the stem. The end 18 of socket member 15 being used as the anvil to receive the blow and being therefore slightly thickened or reinforced for this purpose.

Tubular member 16 is split longitudinally at one or more points as indicated at 22 to allow for expansion of the wood due to the atmospheric conditions and also to facilitate the positioning of said tubular member and make allowance for irregularities in the manufacture of the respective parts.

These slots are preferably arranged at right angles to the wedge or web portion 19 as shown in Figures 1 and 2. Suitable apertures are provided at diametrically opposed points in tubular member 16 and reduced portion 11 is bored as at 24 for receiving a driving or other fastening device 25, to form additional means for securing the handle to the stem.

In the modified form shown in Figure 5 the end wall 26 has formed integral therewith an inverted cone-shaped projection 27 which when the handle is driven in position on the stem will cause the upper end thereof to expand in the socket.

The handle construction made in accordance with my invention is strong and durable and being formed entirely of metal all danger of cracked parts or splinters caused in the wood handles by checks of the wood, is eliminated. The handle is provided with smooth surfaces for the hand of the workman, is light in weight and is so constructed that all danger of breakage of the handle is reduced to minimum. My novel method of joining the handle to the stem by expanding the entering end thereof by means of a wedge disposed within the socket provides simple means for securing the stem in the socket so that the handle is firmly held on the stem and will not become loose.

While I have shown and described the preferred form of my improved handle construction it is obvious that various changes and modifications could be made in the same without departing from the spirit of my invention.

I claim:

1. A handle for tools comprising a single piece casting having a socket member adapted to receive the end of a wooden stem and provided in the upper end of said socket with an integral downwardly presented wedge adapted to be driven into the end of said stem to expand it laterally in said socket.

2. A one-piece cast handle for tools comprising a hand piece, arms depending from the ends thereof and merging together at their lower ends, a socket member projecting from the merged portions of said arms, and a wedge element lying in a plane disposed transversely of said hand piece and extending downwardly from the upper end of said socket member.

3. A one-piece cast handle for tools comprising a hand piece, arms depending from the ends thereof and merging together at their lower ends, a socket member projecting from the merged portions of said arms and having slots in its sides to permit deflection of the sides toward each other to tightly embrace a wooden stem inserted in said socket, and a wedge member lying in a plane disposed transversely of said hand piece and extending downwardly from the upper end of said socket member.

4. A one-piece cast handle for tools comprising a hand piece, arms depending from the ends thereof and merging together at their lower ends, a socket member projecting from the merged portions of said arms and having slots in its sides, and a wedge element lying in a plane disposed transversely of said handle and extending downwardly from the upper end of said socket member and extending from side to side of said socket and merging with the sides of said socket intermediate said slots whereby said wedge and the socket interior may be formed in the casting operation by a core anchored through said slots.

In testimony whereof I hereunto affix my signature this 18th day of May, 1926.

LEWIS S. MURPHY.